Aug. 4, 1925.

C. E. SEARS 1,548,489

THERMOMETER

Filed March 24, 1923

Inventor.
Clarence E. Sears.
Wallace R. Lane
Atty by

Patented Aug. 4, 1925.

1,548,489

UNITED STATES PATENT OFFICE.

CLARENCE E. SEARS, OF CHICAGO, ILLINOIS.

THERMOMETER.

Application filed March 24, 1923. Serial No. 627,247.

*To all whom it may concern:*

Be it known that I, CLARENCE E. SEARS, a citizen of the United States, residing at Chicago, Illinois, have invented certain new and useful Improvements in Thermometers, of which the following is a specification.

The present invention relates to devices for determining the temperature of contents of a vessel, more especially by contact with a wall of said vessel to which heat is transferred from the contents outwardly, such devices being generally referred to as thermometers. Among the objects of my invention are to provide means for determining easily and accurately the temperature of dough in a dough mixer; to provide means for determining the temperature of dough without inserting a thermometer into the mass of dough; to provide a thermometer attachable to an external wall of a container; to provide a thermometer so constructed that in case of accident to the tube, a new tube can be substituted for the broken one; to provide a thermometer so constructed that vibration of the mixer and flexure of the wall thereof cannot cause fracture of the tube; to so attach a thermometer to a dough mixer that the temperature of the dough can be gotten accurately; to provide means for reducing the danger of accident to the tube of the thermometer; to provide means minimizing the effect of surrounding atmosphere upon the thermometer; to provide means for determining the temperature of the dough while the mixer is running; to provide a thermometer which is readily attachable to a mixer so that there is no danger of the thermometer being misplaced when it is desired to use it; to reduce the strain on motor and mixer due to starting under load; to provide a less expensive but more reliable thermometer for dough mixers; and such further objects, advantages, and capabilities as will later more fully appear.

My invention further resides in the combination, construction, and arrangement of parts illustrated in the accompanying drawing, and while I have shown therein a preferred embodiment of my invention, I desire the same to be understood as illustrative only, and not as limiting said invention.

Figure 1:
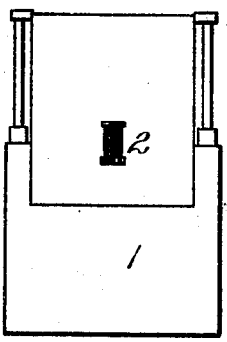
Figure 2:
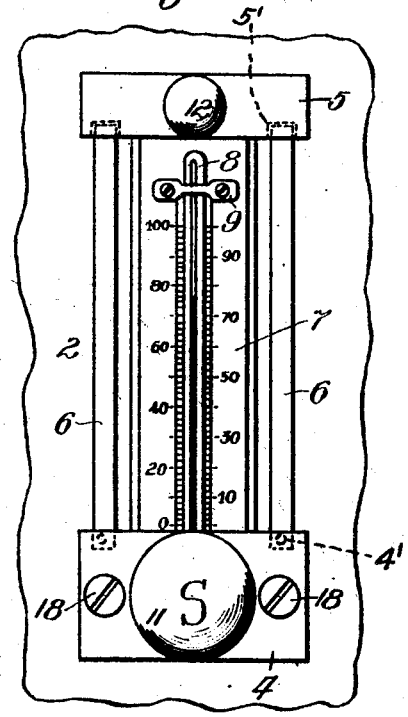
Figure 3:
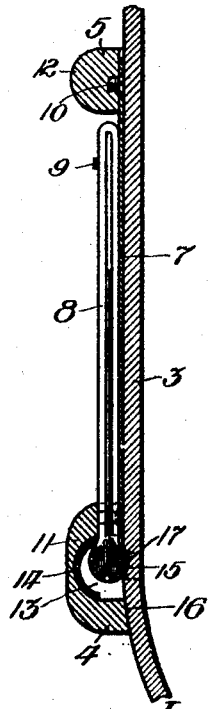

In the drawing annexed hereto and forming a part hereof, Fig. 1 is a more or less diagrammatic elevation of a dough mixer showing the location of my new thermometer with relation to the wall of the mixer; Fig. 2 is an elevation of this new thermometer; and Fig. 3 is a longitudinal section taken substantially centrally of Fig. 2.

Referring more in detail to this drawing, numeral 1 designates the mixer in general, and numeral 2 the thermometer in general. The details of construction of the dough mixer are well known and are therefore not shown in this application. A common type of dough mixer has a bowl whose side walls are approximately flat and are connected by a curved bottom, as partly illustrated in Fig. 3. The thermometer of the present invention is designed to be attached to the wall 3 of the bowl just at the point where the flat wall merges into the curved bottom. The thermometer comprises a heavy bottom cross bar 4, a top cross bar 5, a pair of longitudinal side rods 6, and a plate 7 carrying the tube 8, said tube being preferably secured to the plate by a pair of removable cross elements 9. If desired, this tube may be held in place by a single cross piece 9, but it is preferred that such cross piece or cross pieces be detachably connected to the plate 7, which plate may be secured to the cross bar 5 in any desired manner, such as a screw or rivet 10, as shown in Fig. 3, or by a plurality of such securing means.

The cross bar 4 is preferably provided with a projection or protuberance 11 and the cross bar 5 with a similar protuberance 12. The projections, extending as they do considerably beyond the surface of the tube 8, have a tendency to prevent objects from striking against and breaking this tube. Furthermore, there is provided in the interior of the projection 11 an open space 13 which is lined part way with a heat insulating material 14 such as asbestos, to prevent transference of room temperature through the metal of the cross bar 4 to the air of chamber 13 and from thence to the bulb 15 of the thermometer 8. The inner face of cross bar 4 is slightly curved to fit the outer face of wall 3 as shown at 16. In applying the thermometer to the bowl of the dough mixer, a slight depression 17 is drilled into the external face of the bowl for the reception of the bulb 15 of the thermometer tube. To be most effective the bulb 15 should fit as closely to the surface of the cavity 17 as is possible without being actually in contact therewith. The heat will then be transferred through this wall 3 and radiated to the bulb 15, thereby furnishing an accurate reading of the temperature of the contents of the bowl. This is also facilitated by reason of the heat insulating material 14 which prevents heat transference between the space 13 and the surrounding atmosphere. It will thus be seen that the temperature indicated will be fully as accurate as, if not more so, than, when the thermometer bulb is placed inside of the mass of material within the bowl. The thermometer is attached to the wall 3 by the screws 18.

In order that the thermometer may be held together securely, but detachably, the side bars 6 may be rigidly secured in the cross bar 4 as at 4', but removably secured within the cross bar 5 as by forming the bar 5 with sockets 5'. When the screws 18 are removed from the thermometer the back plate 7 carrying tube 8 may be swung backwardly away from the cross bar 4 so as to remove the bulb from the opening 13 and then the cross bar 5 can be easily removed from the ends of the bars 6. Because of the construction here specified, the parts will be held together sufficiently securely but still be in such condition that they can be easily separated. Furthermore, by reason of the construction specified, it is possible to remove the thermometer from the dough mixer, take it apart, and supply a new tube in the event one should be accidentally broken. Also, if the cross bars 4 and 5 and side bars 6 are made integral, it results in a more rigid construction, but the tube may still be removed and replaced by a new one, simply by removing the screw or screws 10. It is, of course, understood that it is preferable, and almost necessary, to replace both tube 8 and gauge plate 7 at the same time in order that the thermometer readings may be accurate, since each plate should be graduated to its individual tube. Attention is also called to the fact that the loose mounting of the plate 7 reduces the danger of fracture of the tube by reason of the flexure of the wall 3 and vibration of the mixer during use.

Among the advantages of this construction, besides those set forth above, are that it enables the temperature of the dough in the mixer to be read accurately while the mixer is running and without the necessity of stopping the machine; that less strain is placed upon the motor and parts of the machine because of the reduction in the number of times it is necessary to start and stop the machine while loaded; that this construction makes it possible to save time, labor, and power, as well as prolonging the life of the mixer and motor. The thermometer is durable, accurate and within plain sight of the operator and easily read, always out of the way when dough is being removed from the bowl to a trough, costs less than customary dough thermometers, and is easily and economically manufactured, installed and replaced.

It is, of course, understood that the specific description of structure set forth above may be departed from without departing from the spirit of my invention as set forth in this specification and the appended claims.

Having now described my invention, I claim:—

1. In combination with a dough mixer, having in its outer wall a relatively shallow niche or depression substantially the size of the thermometer bulb, an attachment adapted to be mounted on the outer wall of the dough mixer comprising a support, an index plate and a thermometer having the tube thereof disposed on said support, and means for mounting said support on the outer wall of said mixer so that the bulb of said thermometer tube lies in said shallow depression.

2. In combination with the wall of a dough mixer, an attachment adapted to be mounted on said wall comprising a support having an index thereon, a thermometer tube on said support with its bulb projecting beyond the rear face of said support, and means for mounting said support on the wall of said dough mixer with the bulb projecting substantially into contact with said exterior wall.

3. In combination with an exterior wall of a dough mixer, an attachment therefor comprising a support, an index plate and a thermometer mounted thereon, said thermometer having its bulb projecting rearwardly of said plate, means for mounting said support on said wall with the bulb lying sufficiently near said wall to be heated thereby, a portion of said support forming a housing for said bulb and a heat insulating material disposed in said housing.

4. In combination with an exterior wall of a dough mixer, an attachment therefor comprising a support, an index plate and a thermometer mounted thereon, said thermometer having its bulb projecting rearwardly of said plate, means for attaching said support to the exterior surface of the mixer wall, said support having a substantially cup-shaped portion adapted to enclose the bulb between it and the exterior wall of the mixer.

5. In combination with a dough mixer, an attachment therefor comprising a base forming a bulb housing adapted to be attached to the exterior surface of the mixer wall, an upper support, means for mounting said upper support in spaced relation on said base, an index plate, a thermometer tube mounted on said plate, said plate being mounted solely on said upper support and depending therefrom with the bulb of said tube disposed in said housing, said upper support forming a substantially pendulous mounting for said plate and tube.

6. In combination with a dough mixer, an attachment therefor comprising a support including spaced top and base members, said base member forming a cup-shaped housing and adapted to be attached to the outer surface of the mixer wall, an index plate, a thermometer tube carried by said plate and depending into said housing, said plate being carried by said top member and being detachable from said base.

7. In combination with an exterior wall of a dough mixer, an attachment therefor comprising a support, a thermometer means for attaching said thermometer to said support with its bulb projecting rearwardly of said support, means for mounting said support on said wall with the bulb lying sufficiently near said wall to be heated thereby, a portion of said support forming a housing for said bulb.

In witness whereof, I hereunto subscribe my name to this specification.

CLARENCE E. SEARS.